(No Model.)
F. S. SPRAGUE.
MIRROR ATTACHING DEVICE FOR BUREAUS, &c.
No. 511,660. Patented Dec. 26, 1893.
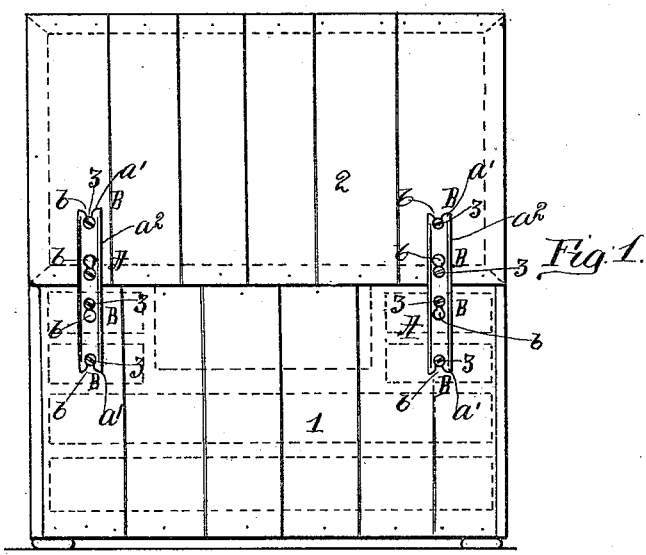
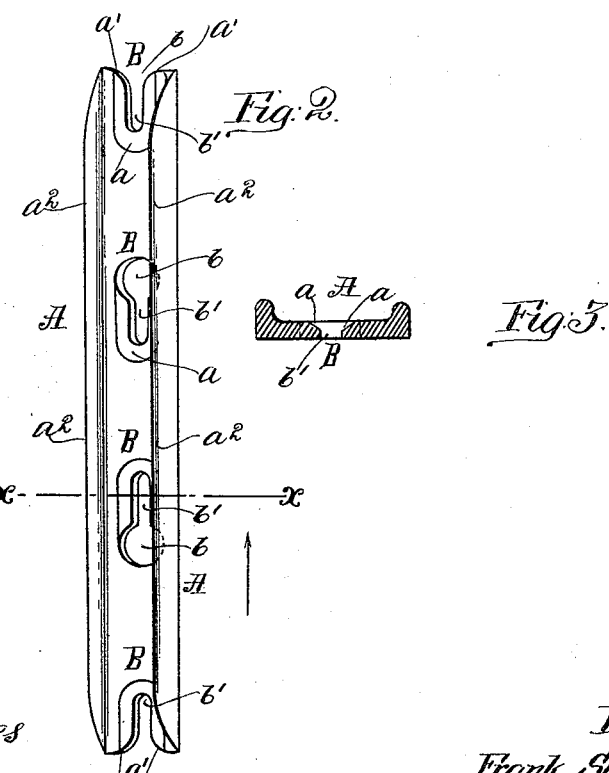
Witnesses
H. E. Leman
James J. Cutler
Inventor
Frank Sumner Sprague
By Thomas W. Hobday
Attorney

United States Patent Office.

FRANK SUMNER SPRAGUE, OF EVERETT, MASSACHUSETTS.

MIRROR-ATTACHING DEVICE FOR BUREAUS, &c.

SPECIFICATION forming part of Letters Patent No. 511,660, dated December 26, 1893.

Application filed March 24, 1893. Serial No. 467,473. (No model.)

*To all whom it may concern:*

Be it known that I, FRANK SUMNER SPRAGUE, of Everett, in the county of Middlesex, State of Massachusetts, have invented a new and useful Mirror-Attaching Device for Bureaus, of which the following is a specification.

In the manufacture of bureaus and other similar articles, it is customary to rigidly retain in a detachable manner the mirror section, by the means of cleats secured partially to the said mirror section and the other portion thereof to the stand section, and in order to attain a disunion of such parts, said retaining cleats are held by screws or nails which have to be withdrawn to enable disconnection of the beforementioned sections.

Thus the object of my invention is to greatly facilitate both a dismemberment and a rigid connection of the said mirror and stand sections aforesaid; and to dispense with having to remove the screws or nails when once relatively entered in the said sections, in order to remove, and connect, such sections.

The essential features of this invention, are a cleat of iron or any other suitable material, having suitable situated openings therethrough so designed as to permit the respective heads of screws to pass through said cleats and engage the face of said cleats to prevent said screw heads, being disengaged, from said cleats when the mirror section is in its engaged primary position, both with such cleats and said stand section.

In the drawings, Figure 1, is a rear view and illustrates my invention engaged with the rear side of the mirror and stand sections, to retain the former section. Fig. 2, is a front perspective view of my invention and Fig. 3 is a cross-section of said Fig. 2, on line $x, x$.

My glass frame supporter (A) can be made any desirable length and provided with any number of openings (B), and can be also made from any suitable material. The openings (B) are so designed as to permit the heads of the screws 3 to pass through the enlarged portion thereof ($b$), and also to prevent such screw heads returning when in a position lower than the enlarged portion ($b$) or in portion ($b'$) of said openings (B), which said narrow portions ($b'$) have their surfaces ($a$) beveled as clearly shown by the view Fig. 3, which is to attain, more contact surface with the engaged screw, than that, if such inclined walls ($a$) (similar to that of an ordinary screw head), were not employed.

The openings at the ends of my supporter as shown by Figs. 1, and 2, have their mouths of such a design as to readily engage with the shank of a screw and direct such into the narrow portion ($b'$) thereof, which I attain by curving the mouth walls ($a'$) as shown by said views.

($a^2$) represents ribs which are to strengthen the aforesaid supporter, while such supporter may be made light in weight. The openings that engage with the screws, entered, the stand section (1), have their screw-head entering portions ($b$) below the said screw heads, thus requiring that such supporting device (A) be inverted to disconnect such device (A), from the stand section. The openings that engage with the screws entered the mirror section (2) have their screw-head entering portions ($b$) above the said screws when said mirror section is in its primary position as illustrated by the beforementioned Fig. 1, thus requiring that such mirror section (2) be inverted to disconnect the said mirror section from the said retaining device (A) and stand section (1). It will be thus observed, that when the aforesaid mirror section is supported by the said glass supporter and stand section, the said glass supporter cannot be disconnected from such combined sections as the respective screws, entered, such sections prevent a vertical movement, or any other movement of the said glass supporter, capable of permitting its being disconnected from both said sections, without removing the screws and that to effect a separation of the aforesaid supporter, it is requisite to first remove the mirror section. Consequently, it will be readily seen, that I effect a means whereby the mirror section can be immediately separated, and supported; also that the said mirror section acts as a key to the combination.

Having thus described the nature of my invention, I claim—

A mirror attaching device for bureaus, consisting of a cleat of suitable material having open slots at each end and keyhole slots equidistant from said ends, and the enlarged portions of said slots being oppositely situated, substantially as described.

In testimony whereof I have signed my name to this specification, in the presence of two subscribing witnesses, this 20th day of March, A. D. 1893.

FRANK SUMNER SPRAGUE.

Witnesses:
 THOMAS W. HOBDAY,
 JAMES J. CUTLER.